United States Patent [19]
Sekhar

[11] Patent Number: 6,099,978
[45] Date of Patent: Aug. 8, 2000

[54] MOLYBDENUM SILICIDE-CONTAINING PRODUCTS WITH HIGH EMISSIVITY

[75] Inventor: Jainagesh A. Sekhar, Cincinnati, Ohio

[73] Assignee: Micropyrctics Heaters International, Inc., Cincinnati, Ohio

[21] Appl. No.: 09/238,454

[22] Filed: Jan. 28, 1999

Related U.S. Application Data

[63] Continuation of application No. 08/608,475, Feb. 28, 1996.

[51] Int. Cl.$^7$ ...................................................... B32B 9/00
[52] U.S. Cl. ........................ 428/688; 428/209; 428/408; 428/428; 428/457; 428/469; 428/472; 428/697; 428/698; 428/702; 501/87; 501/92; 419/56; 219/541
[58] Field of Search .................................... 428/408, 698, 428/697, 446, 428, 699, 469, 457, 472, 209, 702, 688; 257/387; 501/92, 128, 87; 219/541, 553; 419/56

[56] References Cited

U.S. PATENT DOCUMENTS

| 4,928,027 | 5/1990 | Deininger et al. ........................ 310/71 |
| 4,999,144 | 3/1991 | Miyamoto et al. ....................... 264/56 |
| 5,445,887 | 8/1995 | Casti ....................................... 428/408 |
| 5,449,886 | 9/1995 | Zhu et al. ............................... 219/541 |
| 5,484,568 | 1/1996 | Sekhar et al. ............................ 419/41 |

*Primary Examiner*—Deborah Jones
*Assistant Examiner*—Abraham Bahta
*Attorney, Agent, or Firm*—Jayadeep R. Deshmukh

[57] ABSTRACT

High emissivity molybdenum silicide-containing ceramic and metal-ceramic products are provided, especially for use as heaters in rapid solidification processing (RSP) and rapid thermal processing (RTP). Novel designs incorporating such heaters are also provided.

1 Claim, 4 Drawing Sheets

MOLYBDENUM SILICIDE-CONTAINING PRODUCTS WITH HIGH EMISSIVITY

This application is a continuation of Ser. No. 08/608,475 filed Feb. 28, 1996.

FIELD OF THE INVENTION

The present invention provides molybdenum silicide-containing ceramic and metal-ceramic products having emissivities of at least about 0.7. More specifically, this invention provides ceramic and metal-ceramic products for use as heaters in applications such as rapid solidification processing (RSP) and rapid thermal processing (RTP) of silicon wafers. Additionally novel designs incorporating such heaters are provided.

BACKGROUND OF THE INVENTION

There are several technologies which use rapid heating and cooling to generate unique micro structures and properties in various classes of materials. As an example, these include rapid solidification processing (RSP) and rapid thermal processing (RTP), interalia, of silicon wafers. RTP is of great importance because it appears that single-wafer and cluster-based tools will be the preferred manufacturing approach taken by the silicon device industry. The primary problem which exists, and which has existed for the past several years with the commercialization of these technologies, and the further spread of such technologies, is the non-availability of adequate (and low cost), area heating devices. Devices such as laser or lamps are point source devices and, therefore, cannot be properly or efficiently employed for the purposes required for RTP and RSP type applications. The molybdenum silicide-containing ceramic and metal ceramic products of the present invention, if used as heaters, enable one to effectively utilize RTP and RSP techniques. The term "molybdenum silicide", as used herein, refers to any silicide of molybdenum having the generic formula $Mo_x Si_y$. The unique and novel properties of the products of the present invention, specifically, the high emissivity of the products of the present invention and also the much greater resistivity, make them especially suitable for application in RSP and RTP type inventions, as will be described in greater detail below.

Preferably, the products of the present invention are manufactured using the technique described and claimed in copending application Ser. No. 08/027,710, filed Mar. 8, 1993, the corresponding PCT application of which was published as WO 94/20243 on Sep. 15, 1994 (herein after collectively referred to as "the '710 application"). This method comprises optimizing performance characteristics of a combustion synthesized ceramic or metal ceramic product, the product having thermal and mass gradients, a lowest melting phase having a melting point and said product having homogenous sections separated by non-homogenous sections, each said homogenous section being separated from the next homogenous section by an average repetitive distance, the product having been manufactured by blending a mixture comprising between about 5% and 95% by total weight of the mixture, of at least one reactive system, wherein said reactive system comprises at least two particulate combustible materials which will react exothermically with one another by combustion synthesis and are present in such proportion to one another that combustion of said mixture will occur when ignited, up to 95% by total weight of the mixture, of a filler material, and optionally a sufficient amount of a liquid phase in order to form a slurry, fashioning said mixture into a desired and uncombusted shape, and combusting said shape by ignition at a temperature between about 150° C. and 1800° C.; the method comprising the steps of: initially applying sufficient current to the product so as to heat the product to a minimum of 50% of the melting point in degrees Kelvin, of the lowest melting phase in the product, wherein the current applied is selected from the group consisting of a DC current, an AC current, a pulsed current and an induction current; and greatly reducing porosity of said product so as to make the repetitive distance between consecutive homogenous sections of said product to less than 0.002 m, by increasing said current applied so as to cause elimination of said thermal and mass gradients.

The referenced combustion synthesis, also known as micropyretic synthesis or self-propagating high-temperature synthesis (the term Micropyretic Synthesis is preferred for slurries), is a novel processing method for the production of intermetallics, engineering ceramics, metal-ceramics, and other materials. See U.S. Pat. No. 5,188,678 hereinafter referred to as the '678 patent. The technique employs exothermic reaction processing which circumvents difficulties associated with conventional methods of time and energy-intensive sinter processing. Complicated engineering gear shapes, such as shown in the '678 patent, have been successfully produced by this technique.

Two basic micropyretic synthesis modes are commonly employed, namely the wave propagation mode and the thermal explosion mode. In the wave propagation mode, the combustible compact is ignited at a point by a heat source. After ignition, the heat required to propagate the combustion wave is obtained from the heat released by the formation of the synthesized product. The unreacted portion in front of the combustion wave is heated by this exothermic heat, undergoes synthesis, the wave propagates, thus causing further reaction and synthesis. In the thermal explosion mode, the specimen is heated in a furnace. The furnace may be kept at the ignition temperature or the specimen may be heated in the furnace at a predetermined heating rate to the ignition temperature. The combustion reaction in this mode may occur more or less simultaneously at all points in the specimen. Although the combustion product phases obtained by both techniques are similar, there may be differences in the amount of residual porosity and the final dimensions of the synthesized part.

The advantages of micropyretic synthesis techniques include rapid net shape processing as disclosed in the '678 patent and clean products. When compared with conventional powder metallurgy operations, micropyretic synthesis not only offers shorter processing time, but also eliminates the need for high-temperature sintering. Volatile impurities or contaminants are expected to be expelled as the high temperature combustion wave propagates through the sample, and thus the synthesized products have high purity.

In most combustion synthesized products, porosity of the final product is often the most uncontrollable and deleterious drawback. It has been shown that porosity degrades mechanical properties in combustion synthesized parts. See, H. P. Li, S. Bhaduri and J. A. Sekhar, Metal Trans A 1992, vol. 23 p 251–261. Porosity increases with the proportion of the material which is combustible as this raises the combustion temperature. Porosity mainly develops from (a) the molar volume differences between reactants and products; (b) the porosity from the initial powder or slurry compact (see the '678 patent and United States Patent 5,279,737, hereinafter referred as the '737 patent); (c) gases adsorbed and absorbed in the initial reactants; and (d) the expansion, swelling and related pressure of gases in the initial compact.

The techniques for elimination of porosity from products of combustion synthesis have included the following: (1) the simultaneous synthesis and sintering of the product; (2) the application of external force or pressure during or soon after combustion. See e.g.: U.S. Pat. No. 4,909,842 and J. Puszynski, S. Majorowski and V. Hlavacek, Ceram Engn. Sci. Proc.,Vol. 11, p.1182,1990.; (3) the use of liquid phases in the combustion process to promote the formation of dense products. See e.g.: Z. A. Munir and U. Anselmi-Tamburini, Mater. Sci. Reports, vol. 3, p. 277, 1989; J. B Holt, S. D. Dunmead, Annual rev of Mater Sci. vol. 21 pg 305, 1991; Z. A. Munir, Amer Ceram Bull, Vol 67(2), pg. 342, 1988; H. C. Yi and J. J. Moore, J. Mater Sci., vol. 25, p 1159, 1992; J. Subramanyam and M. Vijaykumar, J. Mater. Sci. vol 27. pg. 6249, 1992; and U.S. Pat. No. 4,961,778 and U.S. Pat. No. 4,610,726 (not directed towards combustion synthesized samples but incorporating liquid phase for densification); and (4) lessening the gas evolution by outgassing the reactant compact prior to ignition.

All the techniques mentioned above have serious drawbacks. Combustion processes are rapid by nature and the time for simultaneous sintering is always too short to be of value.

External force or pressure is difficult to apply in most situations involving combustion, a point made in detail in the '678 patent. Additionally, such application of pressure (normally as high as 0.3 GPa) limits this method to use with simple shapes like cylinders and to situations where die damage is not a problem. Die damage invariably occurs when pressure is applied at the high temperatures usually associated with combustion synthesis. In fact to overcome the problems and high cost associated with die damage, several variations of the pressure techniques have been developed. These include (a) hot pressing immediately after the combustion wave; (b) hot rolling behind the combustion wave; (c) high pressure during combustion; and (d) shock wave consolidation with explosives or by dynamic compaction. See Z. A. Munir and U. Anselmi-Tamburini, Mater. Sci. Reports, vol. 3, p 277, 1989; J. B Holt, S. D. Dunmead, Annual Rev. of Mater. Sci. vol. 21 p 305, 1991; and Z. A. Munir, Amer Ceram Bull, Vol 67(2), p 342, 1988; H. C. Yi and J.J. Moore, J. Mater Sci., vol. 25, p 1159, 1992; J. Subramanyam and M. Vijaykumar, J. Mater. Sci. vol 27. p 6249, 1992; S. D. Dunmead, Z. A. Munir, J. B. Holt and D. D. Kingman, Combustion and Plasma Synthesis of High Temperature Materials, Z. A. Munir and J. B. Holt eds., VCH Publishers, New York, p 229, 1990; J. B. Holt, Mater Research Bull., Vol 12(7), p 60, 1990; and L. J. Kecskes, T. Kohke and A. Niler, J. Amer Ceram. Soc., vol. 73, p 1274, 1990; L. J. Kecskes, R. F. Benk and P. H. Netherwood Jr., J. Amer Ceram Soc., Vol. 73, p 383, 1990. Notably, however, none of the techniques developed to avoid die damage have eliminated this problem.

If a liquid phase is involved then it is hoped that this liquid phase will wet the products and will fill the porosity which is formed during the combustion, thereby leading to the formation of denser products. Unfortunately this technique has several drawbacks including the fact that most often the liquid does not wet the products. The volume of the liquid may not be enough to fill the pores and the residence time of the hot liquid again may be too short to fill the pores in time. To improve such drawbacks simultaneous liquid formation and pressure application has been tried by centrifuging the part, but with limited success. See e.g. P. Odowara, J. Amer Ceram. Soc. Vol. 73(3), p 629, 1990. In any case, 130 G's ( a 'G' is the unit for acceleration due to gravity~9.81MN/m$^2$), had to be applied for making the liquid enter the pores. Such a high applied acceleration limits the size of the part that may be densified and additionally limits the kind of material which may be densified. These problems are distinct from the complexity that would be required for an experimental system which would be capable of applying such accelerations at the high temperatures at which combustion synthesis typically occurs.

The simplest method to eliminate the porosity would really have been a high temperature sintering of the combustion synthesized part in a suitable furnace. If at all possible, the application of this technique is limited in situations where densification has to occur at temperatures well above 1500° C., because of the limited availability and the small sizes of furnaces at such high temperatures. Although the furnace sintering method is simple, there are other drawbacks to such an operation, aside from the high costs normally associated with furnace sintering. The real disadvantage of such a technique lies in the fact that the agglomerated porosity (such as always obtained in combustion synthesis) cannot be eliminated in this manner to obtain full density. See e.g. B. Kellet and F. Lange J. Ceram. Soc. vol 72, p 725, 1989. Additionally, non-homogeneity will not be eliminated but in fact will be accentuated by such furnace treatment. Most often combustion synthesis by its very nature occurs by propagation of combustion fronts which are spatially marginally unstable. Only in very rare cases such as when TiC is synthesized, is the front completely stable. The instabilities are minor and may not always be apparent to the naked eye, but they do exist. The final part moreover possesses minute bands or other types of non-homogeneities which make electrical and magnetic properties non-uniform. After furnace sintering such non-homogeneities will persist and even amplify into several zones with gross discontinuities.

Outgassing merely holds porosity constant. No actual densification of compact occurs, except to acconmmodate change in molar density from slurry phase to product phase. Thus outgassing only avoids large pores.

When dealing with parts.:which look like wires or thin plates (see U.S. Pat. No. 5,484,568, herein after referred to as "the '568 patent" and U.S. Pat. No. 5,449,886, herein after referred to as "the '886 patent") and which are made from pliable pasty reactants, is impossible to apply pressure or centrifuge without seriously damaging the part in question. In addition, in cases where little or no liquid is created during combustion, the liquid filling technique is impossible to invoke.

Other patents disclosing molybdenum disilicide containing ceramic or metal ceramic composites are: U.S. Pat. Nos. 5,376,421, Dec. 27, 1994; 5,374,342, Dec. 20, 1994; 5,364, 513, Nov. 15, 1994; 5,364,442, Nov. 15, 1994; 5,340,448, Aug. 23, 1994; USP 5,340,014, Aug. 23, 1994; 5,316,718, May 31, 1994; 5,310,476, May 10, 1994; 5,279,737, Jan. 18, 1994; 5,217,583, Jun. 8, 1993; 5,188,678, Feb. 23, 1993; 5,127,969, Jul. 7, 1992; and 5,110,688, May 5, 1992. Finally, PCT/US95/04417 filed on Apr. 11, 1995, discloses a reduced pest ceramic, intermetallic or metal ceramic composite including a compound selected from the group consisting of compounds between molybdenum and silicon, tungsten and silicon, and at least 0.5 percent by weight excess added elemental silicon than that required for formation of the compound. Also disclosed in such PCT application is a reduced pest, ceramic, intermetallic or metal ceramic composite including ternary compounds and mixtures thereof selected from the group consisting of $(ZAl_xSi_y)$, where Z is an element and where x is an integer and y is a whole number. All these patents and the PCT application are incorporated by reference herein in their entirety.

SUMMARY OF THE INVENTION

It is a primary object of the present invention to provide a molybdenum silicide containing product having an emissivity of at least about 0.7.

It is another object of the present invention to provide a molybdenum silicide containing product especially suited for use in RTP and RSP processing.

It is a further object of the present invention to provide a convection heat transfer technique for RTP processing.

In accordance with the present invention, there is provided a molybdenum silicide-containing ceramic or metal-ceramic product having an emissivity of at least about 0.7. In accordance with another aspect of the present invention, there is provided an improvement in RTP processing wherein the heat is applied by convective heating.

These and other objects and aspects of the present invention will become apparent from the following description of the preferred embodiments.

DETAILED DESCRIPTION OF THE PREFERRED EMBODIMENT

Figure 1:
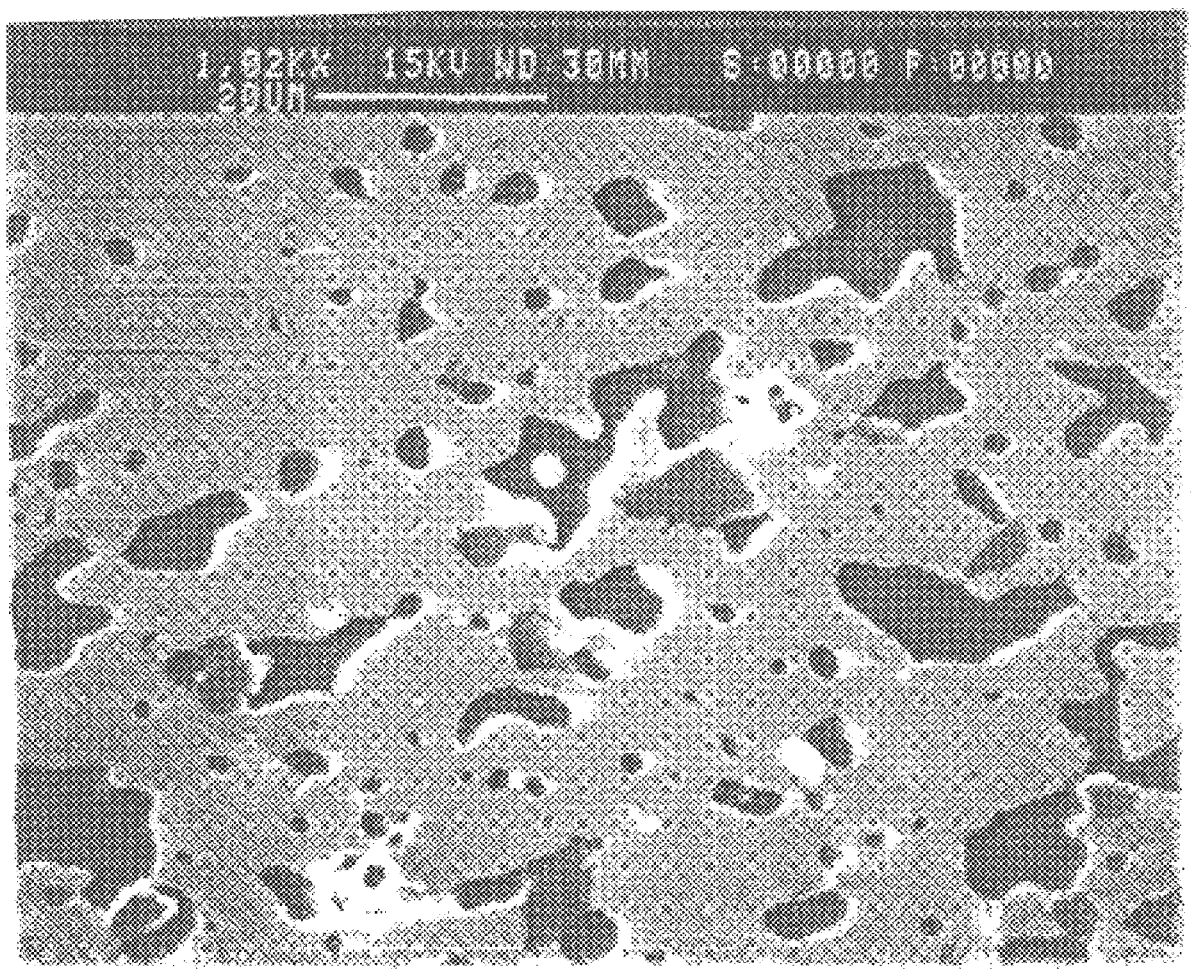
FIG. 1 shows a Scanning Electron Micrograph (SEM) of a product in accordance with the present invention.

In accordance with a preferred embodiment of the present invention, the initial composition of the molybdenum silicide-containing product, when it is manufactured using combustion synthesis includes combustible materials, filler materials including conductive phases, sintering agents and plasticizers. The combustible components provide enough heat to sinter the sample and weld the conductive phases during the combustion reaction. According to the present invention, the combustible sources could be, for e.g. the mixture of $MoO_3+2Al+2Si$. The combustible materials can be pre-mixed before mixing with filler and plasticizer materials and also can be mixed with filler and plasticizer at same time. In the case of the $MoO_3+2Al+2Si$ system, the combustible content can be 10–50 wt %, or more preferably 12–30 wt %. Filler materials could contain conductive phases, sintering agents and other active or inactive materials. In the case of molybdenum silicide-containing products and terminals, molybdenum silicide may be used as a main filler material and its content can be 50–85 wt %. A high content of molybdenum silicide phase will increase the conductivity after combustion. Other filler materials could include one or more combinations of $WSi_2$, SiC, Colloidal $SiO_2$, Colloidal alumina, etc. These filler materials will act as sintering agents or inert filler and will enhance sintering process during passage of the current to the product, and will also reduce the incidence of combustion cracks. The plasticizer used in this invention could be bentonite, the content for molybdenum silicide-containing products manufacture being 1–10 wt %, more preferred, 3–6 wt %.

In the compositions set forth hereinafter, all percentages are by weight.

Procedure

Step 1. The combustible powder is weighed according to the desired composition (see compositions given below).

Step 2. The combustible powders are mixed in a plastic vial with methacrylate mixing balls as mixing media for 10 mins.

Step 3. The mixed combustible powder and other powders ( filler and plasticizer powder) are weighed according to the desired composition.

Step 4. The weighed powders are mixed in a plastic vial with methacrylate balls as mixing media for 30 mins.

Step 5. For composition A below, colloidal silica solution (Nyacol 830, The PQ Corporation) is added according to the composition.

Step 6. The powder and liquid are mixed by pestles for 15–30 mins. The water content should be adjusted to form a plastic mass which is suitable to extrude.

Step 7. The plastic mass is put into a die, and the slurry degassed with a vacuum pump. Then the degassed plastic mass is forced through a die to produce wire.

Step 8. The green product is formed into various shapes such as U-shape or straight wire.

Step 9. The product from step 7 are dried in air for 24 hrs.

Step 10. The product is combusted by propane fuel torch or any other appropriate technique including laser, electron beam, concentrated sunlight, or passage of current, if the compact is conductive.

Step 11. The terminals of combusted product are polished with abrasive paper and cleaned with alcohol and wrapped with metallic(aluminum) foil.

Step 12. Variable AC transformer or power supply is now connected to the foil and the current is used to heat the product to a temperature between 1500–1600° C. (monitored with an optical pyrometer) for 15–30 mins. During this period, the product is being densified. The current is preferably adjusted to be low initially and then gradually increased. It is noticed that initially only some sections of the wire become red indicating that the sample is non-homogeneous. Then as the current is increased the red zone is seen to spread and the sample becomes uniformly the same color indicating that the technique causes homogenization.

Step 13. For the $MoSi_2$-containing products made in this fashion it was noted that the products which were extremely brittle at room temperature became highly ductile at these high temperatures. Thus, these articles can be further shaped, if so desired.

In some instances, a DC power supply was used for cost saving purposes. For obtaining high currents a pulsed power supply was sometimes used. In other variations, the sample was simultaneously combusted and densified with the passage of the electric current. In yet another variation the sample was heated externally with an oxyacetylene flame while current was introduced.

| Composition A: | |
|---|---|
| Combustible: | |
| $MoO_3$ | 17.1 (g) |
| Al | 6.3 (g) |
| Si | 6.6 (g) |
| Excess Si | at least 0.5% over that required for the formation of $MoSi_2$ |
| Filler: | |
| $MoSi_2$ | 62 (g) |

-continued

| SiC | 1 (g) |
| WSi$_2$ | 1 (g) |
| Plasticizer: | |
| Bentonite | 6 (g) |
| Colloidal Silica | 60 ml |

| Composition B: | | |
|---|---|---|
| Combustible | MoO$_3$ | 25.65 (g) |
| | Al | 9.45 (g) |
| | Si | 9.90 (g) |
| Filler | MoSi$_2$ | 50.00 (g) |
| | SiC | 1.0 (g) |
| Plasticizer | Bentonite | 4.00 (g) |

An MoSi$_2$—containing product was formed using the process of the '710 application. The density and strength significantly improved by passing the current to heat the article to about 1550–1700° C. The porosity of the heating element is less than 5%. As stated in composition A, at least about 0.5% excess silicon than that required for MoSi$_2$ formation is added. Preferably the added silicon is at least about 5% excess. Even more preferably, SiO$_2$ in the amount of 0.5 weight percent is added to the preferred composition stated above. Such an element can be used up to 1600° C. Higher temperature products are possible as detailed in the '710 application.

Figure 2:
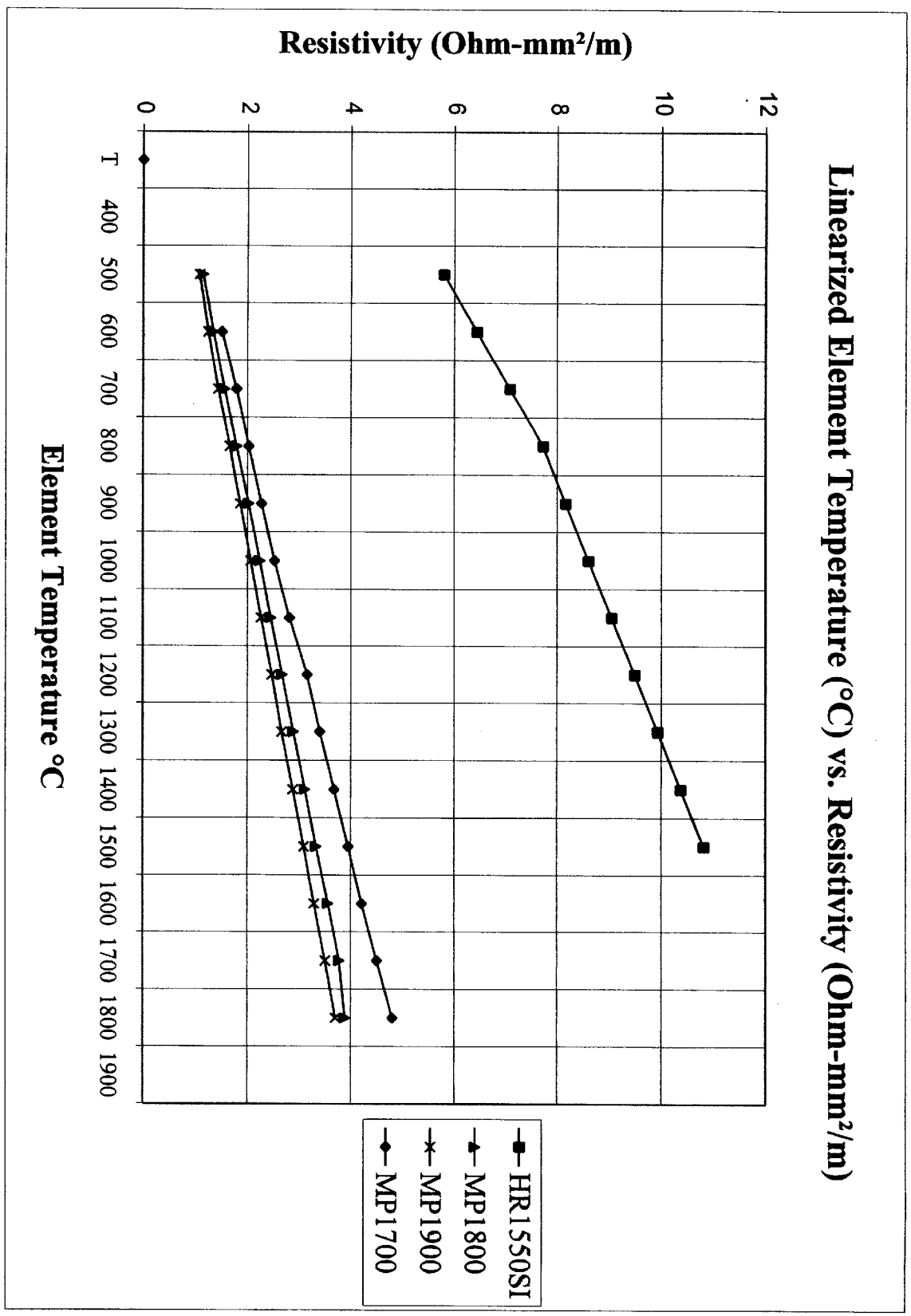
FIG. 2 shows a graph showing the effect of linearized molybdenum silicide-containing product temperature on resistivity.
Figure 3:
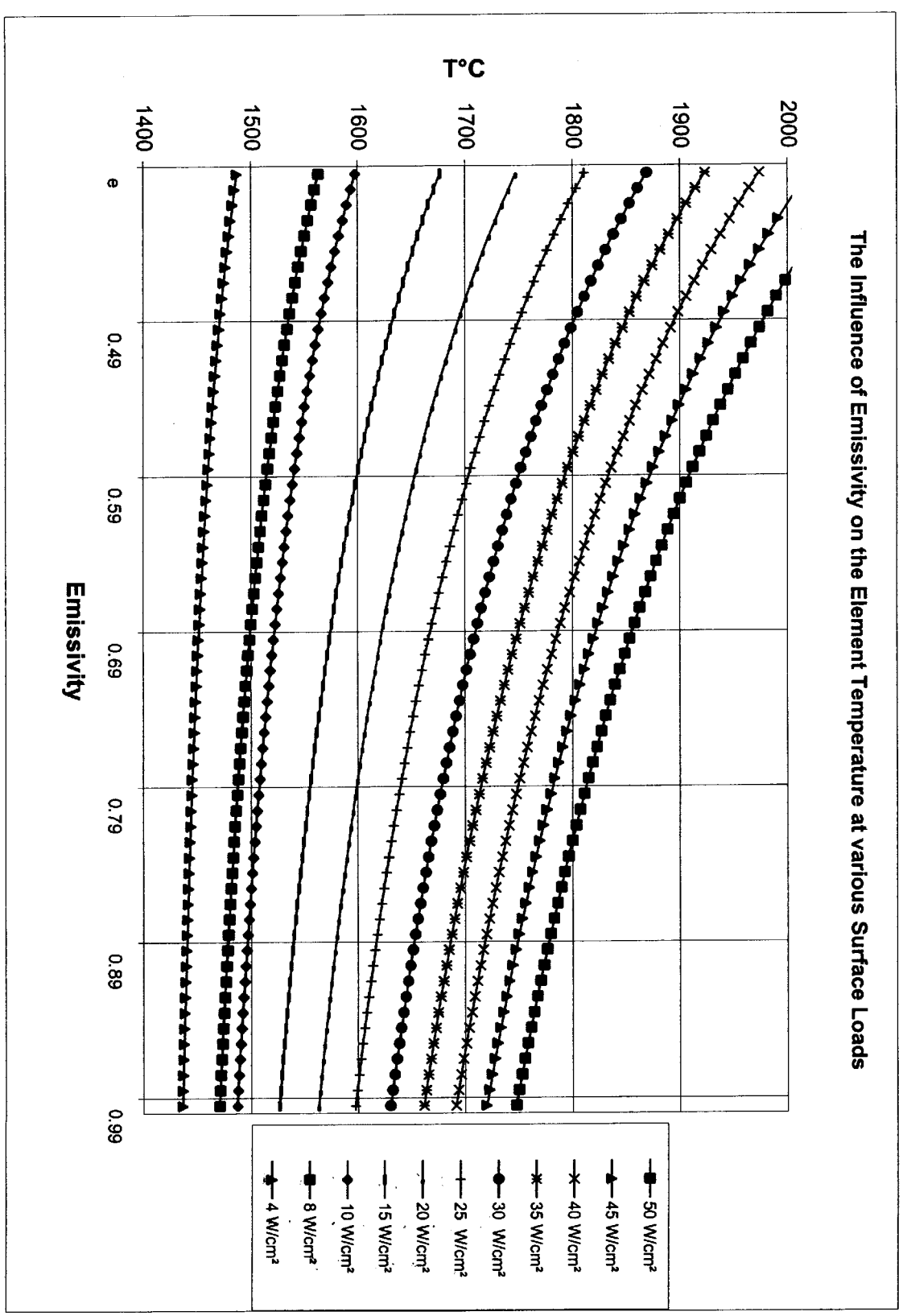
FIG. 3 shows a graph showing the effect of emissivity on temperature of molybdenum silicide-containing product at various surface loads.

FIG. 2 shows a plot showing electrical resistivity as a function of temperature for products with varying maximum use temperatures. As seen resistivity may increase several fold with temperature. The present invention encompasses high emissivity (greater than at least about 0.7) molybdenum silicide-containing products. The most preferred product detailed in the preceding paragraph has an emissivity of about 0.9. Intermediate emissivities (0.75, 0.8, 0.85) are also possible. Such high emissivities afford the possibility of faster transfer of radiative heat and longer product life. In this respect, FIG. 3 shows the influence of emissivity on product temperature for a fixed heated area temperature. If emissivity is low, then the product temperature is high leading to shorter life of the product and vice versa.

To the most preferred product of the preceding paragraphs or to any molybdenum silicide containing product having an emissivity of at least about 0.7, may be added WSi$_2$ and SiC as filler materials. Also, any molybdenum silicide containing product having an emissivity of at least about 0.7, i.e. a product of the present invention preferably has a resistivity which enables heat up rates of 50 to 100° C. per second. Even more preferably, the product has a resistivity ranging from about 5 Ohm-mm$^2$/m to about 12 Ohm-mm$^2$/m.

As an alternative embodiment, a product according to the present invention may be coated with a high thermal conductivity coating. Preferably such high thermal conductivity coating is a diamond coating.

Alternatively the product of the present invention is in contact with a thermally-conductive medium, so as to provide a surface of uniform temperature.

FIG. 1 is a SEM of a product according to the present invention. The porosity is zero. In case of this product, alumina is added to the most preferred product of the preceding paragraphs. The white MoSi$_2$ phase is clearly demarcated from the black alumina phase. The inhomogeneity in a particular combustion synthesized product can be seen best by measuring the distance between the hot spots when the combustion synthesized product is heated. When heated to a high enough temperature, the product gets red hot in homogenous sections and remains cooler in non-homogenous sections.

In a second aspect of the present invention, the applicant has discovered that convective heating can be effectively applied in rapid thermal processing of a particular product, including in methods for the manufacture of products such as silicon wafers. Preferably, such convective heat is applied using, at least in part, a molybdenum silicide-containing ceramic or metal-ceramic product having an emissivity of at least about 0.7. Even more preferably, such convective heat is applied by radiant heating, convective heating, conductive heating or combinations thereof.

Figure 4:
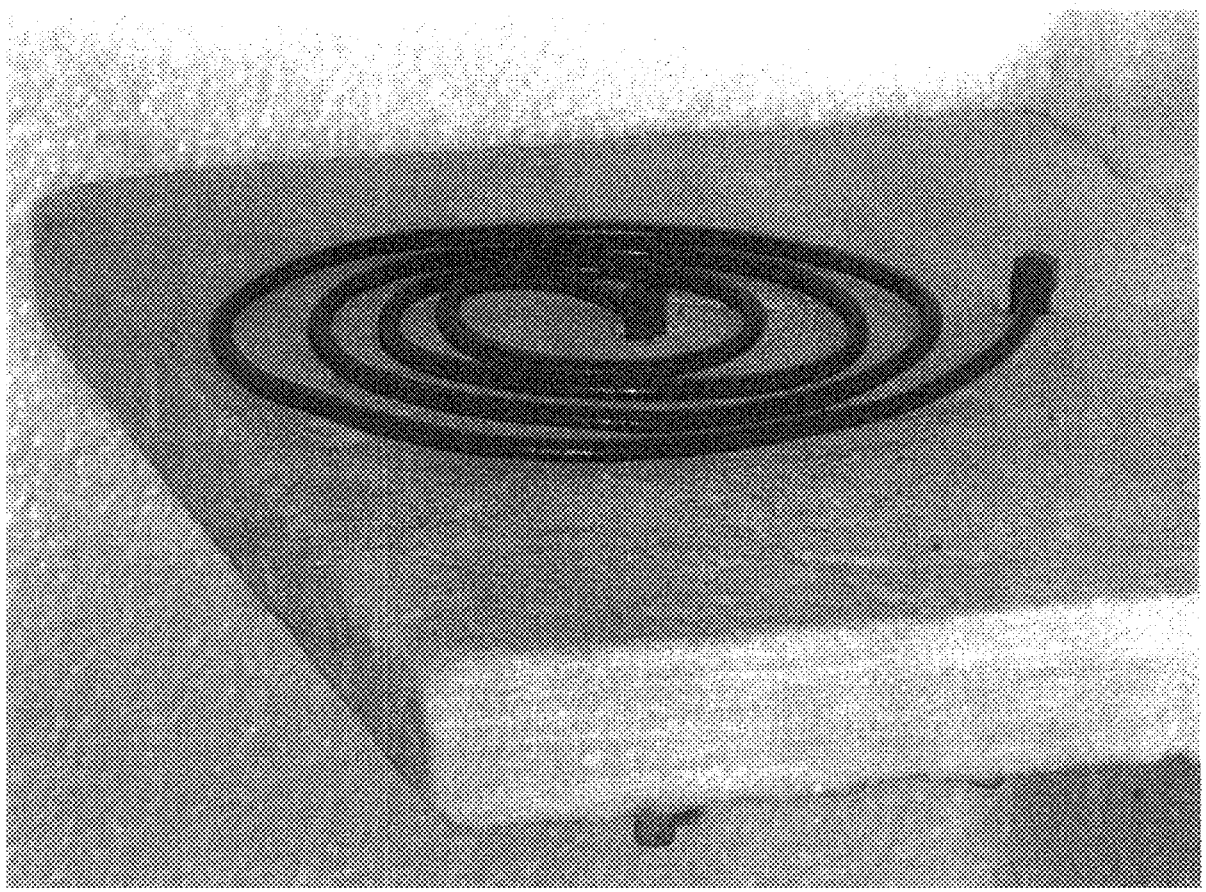
FIG. 4 shows a pancake-type flat circular molybdenum silicide-containing product.

FIG. 4 shows a preferred use of the products of the present invention in the form of pancake-shaped flat circular heating element for radiative heating. It is to be recognized that convective heating as disclosed in PCT/US95/06387 filed on May 22, 1995, is also possible for use in RTP applications. As stated above, a combination of radiative and convective may also be desirable for RTP applications. This application is hereby incorporated by reference herein. The product of the present invention can also be used for as electrical terminals, superconducting wires and products having negative temperature coefficients, products having positive temperature coefficients, products for structural use, products for electrical and electronic applications and products for magnetic applications.

I claim:

1. A molybdenum silicide-containing product, also comprising tungsten silicide, said product having an emissivity of at least about 0.7.

* * * * *